W. E. EASTMAN.
SPRING SUSPENSION FOR VEHICLES.
APPLICATION FILED FEB. 2, 1915.
1,167,054.
Patented Jan. 4, 1916.
3 SHEETS—SHEET 1.
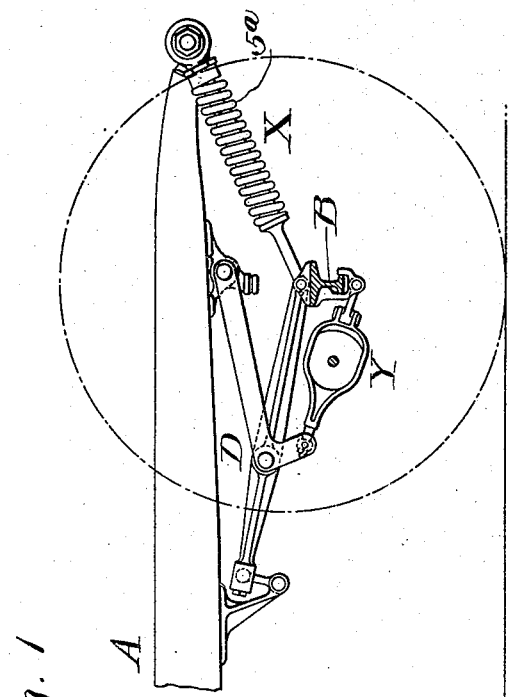
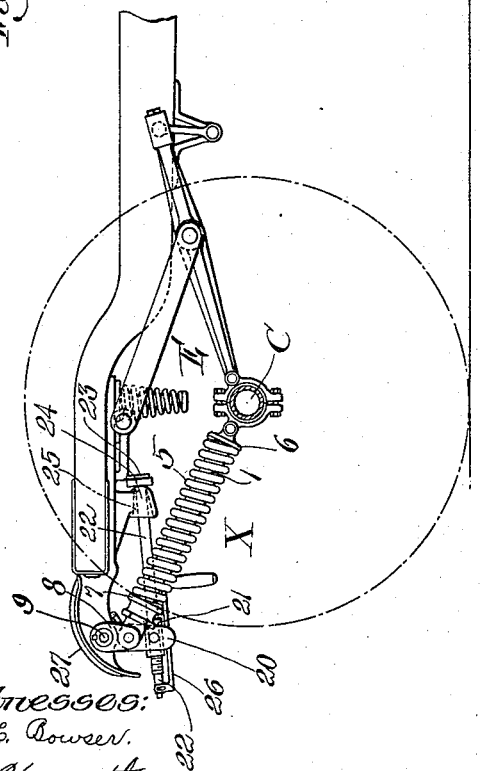
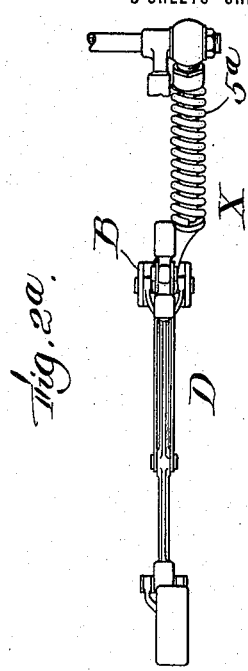
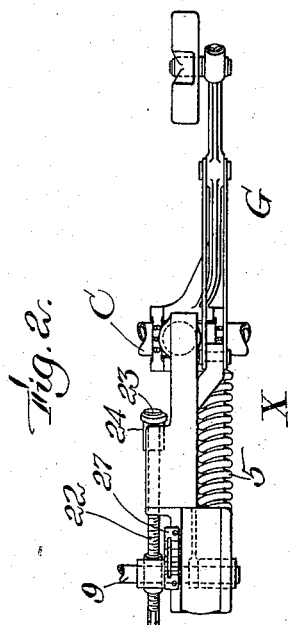
Inventor:
William E. Eastman
by his attorney
Charles F. Richmond
Witnesses:
H. E. Bowser.
L. B. Weymouth.

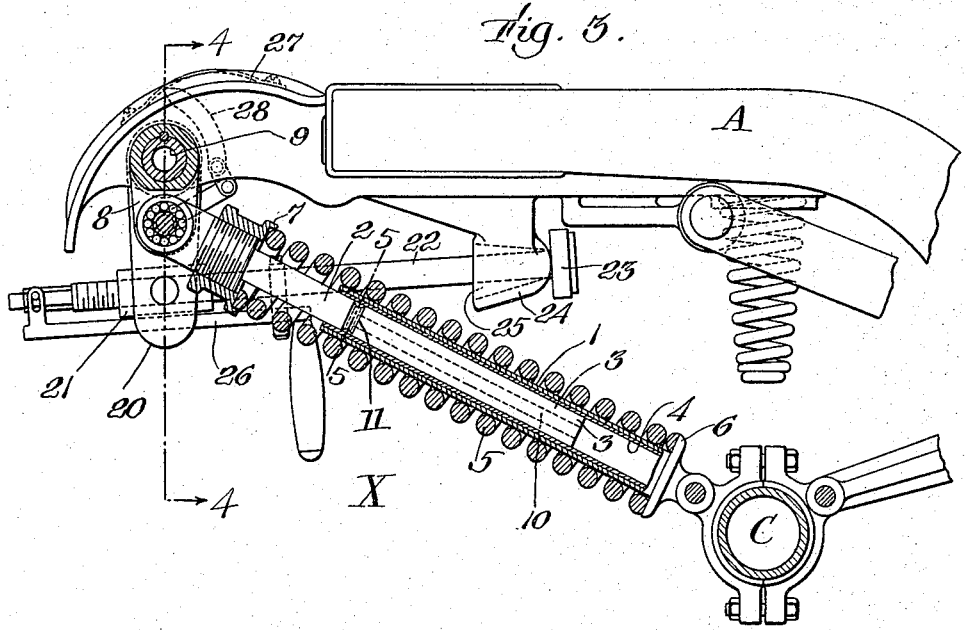
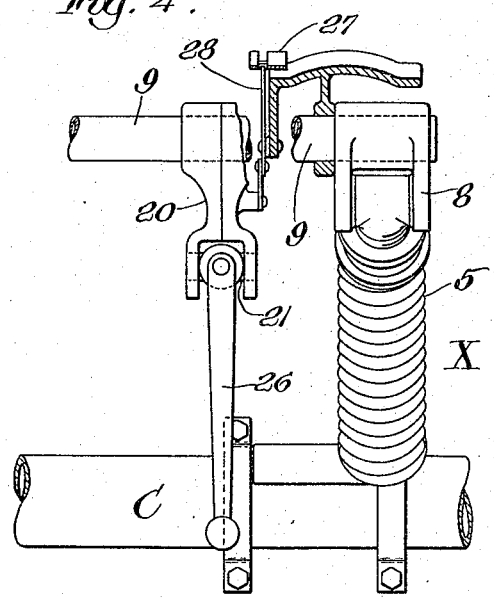
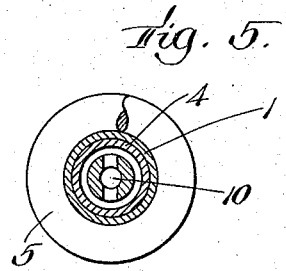

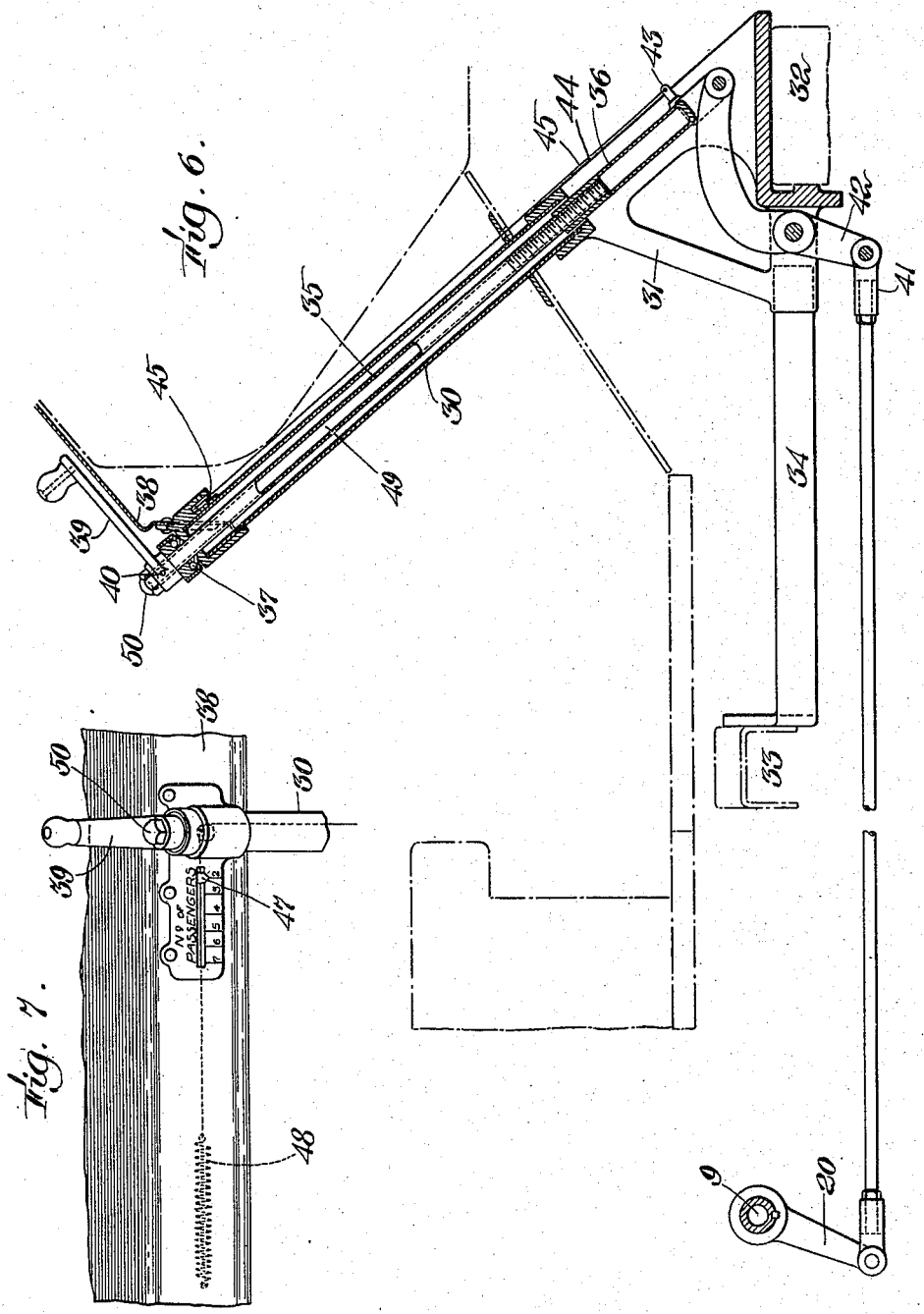

UNITED STATES PATENT OFFICE.

WILLIAM E. EASTMAN, OF WINCHESTER, MASSACHUSETTS.

SPRING SUSPENSION FOR VEHICLES.

1,167,054.   Specification of Letters Patent.   Patented Jan. 4, 1916.

Application filed February 2, 1915. Serial No. 5,783.

*To all whom it may concern:*

Be it known that I, WILLIAM E. EASTMAN, a citizen of the United States, residing at Winchester, in the county of Middlesex and State of Massachusetts, have invented certain new and useful Improvements in Spring Suspension for Vehicles, of which the following is a specification, reference being had therein to the accompanying drawing.

My invention relates to springs for vehicles, in which the thrust of the axle or load, and the resistance thereto operate in a line forming with a vertical plane passing through the point of suspension of the spring on the axle, a varying acute angle.

My said invention is a development of the broad principle of a spring which I term a "compensating spring," illustrated and claimed in United States Letters Patent for vehicles No. 962,557, and issued to me June 28, 1910. This spring is so called, as compared with a vertical spring with weight applied directly above, because with respect to the force applied, the energy, due to the weight of the load acting through a varying acute angle, and compressing the spring; the resulting amount of the vertical movement of the vehicle body in relation to the axle; and the time required for said movement, each, increases during the act of compressing the spring, and thus to a greater extent, tends, respectively, to counter-balance the spring's increasing thrust, to increase its compression, and to require more time for its compression. Consequently, for a given weight of load, the vertical movements of a vehicle provided with compensating springs, are longer and slower, more uniform, and hence easier, than those flowing from vertical coiled springs of the same strength.

The principal objects of my invention are to provide, first a compensating spring which is very strong; which if it breaks, will, notwithstanding said break, not materially affect the riding qualities of the spring, and which may have the desired tension or stiffness for easy riding of the vehicle, carrying varying loads; and second, automatic means for oiling the compensating members of said spring.

The first object is gained by providing a compressible coil spring with suitable environment.

The means employed for attaining the second object, will appear more fully hereinafter.

In the drawings illustrating the principle of my invention, and the best mode now known to me of embodying the same in operative structure, Figure 1 shows in elevation the chassis of an automobile with mid-portion removed, and structure embodying the features of my invention; the wheels being indicated in dotted lines. Figs. 2 and 2ª show in plan what appears in Fig. 1, the frame having been removed for the sake of clearness. Fig. 3 shows my invention in enlarged detail, in longitudinal section, in relation to the rear axle of the vehicle. Fig. 4 is a rear end view of what is illustrated in Fig. 3; the tension handle or crank having been moved down into cranking position. Fig. 5 is a cross section of spring, and its supporting members, on line 5—5 of Fig. 3. Fig. 6 shows in elevation, partly in section, a modified form of adjusting device for the suspension spring; the dashboard, floor, and seat being dotted in. Fig. 7 is an enlarged detail of indicator, mounted on the dashboard.

In Fig. 1 is shown in elevation the chassis A of an automobile, mounted upon forward and rear wheels B, C, by means of suitable connecting levers D, E; and spring devices that embody the features of my invention. These lever connections are substantially shown and claimed in United States Letters Patent No. 1,121,079, and No. 1,048,510 issued to me respectively December 14, 1914 and December 31, 1912 for improvements in spring suspension for vehicles, and are designed principally to hold an axle supporting a vehicle body upon springs, in its movements toward or away from the body, in a plane at right angles to the plane of the body. While I prefer to use these connections, I wish to be understood as not confining the use of my present invention to vehicles employing such connections. Any suitable means for transversely securing the axle in relation to the vehicle body may be used, yet permitting movements of the axle toward or away from the body either in a vertical plane or not.

Of the spring suspension devices, a socket member 1, Fig. 3, has longitudinally and reciprocatingly mounted therein a plunger member 2, provided with a long piston portion 3, which is in engagement with a phosphor-bronze lining 4 within the socket member. Surrounding these members is a coil spring 5, the ends of which are confined between shoulders upon said members, one shoulder 6 integral with say the socket member 1, while the other 7 is in threaded adjustment with the plunger member 2. One or the other of these plunger and socket members, say the latter 1, is pivotally secured to the axle as C, and the former to the chassis either directly, as appears in relation to the forward axle, or indirectly, as through the medium of a suspension lever 8 fixed to a rear rod 9 mounted in suitable bearings in the chassis, and extending across the latter, in relation to the rear axle of the vehicle; this spring shaft being capable of being operated by tension apparatus later to be more fully described.

The length of the coil spring 5 is sufficient to prevent the piston portion 3 of the plunger 2 from striking the bottom of the socket member, even should the spring be completely compressed; the plunger, being to a limited extent adjustable in relation to the socket through a manipulation of the shoulder piece 7 above mentioned.

For oiling purposes, the piston portion of the plunger has a longitudinal hole 10 extending from its free end within the socket member to a transverse opening communicating with a circular groove 11 cut from the outside portion of the piston, so that oil placed in the socket member may through said channels, be forced to or from the frictionally engaging surfaces of the plunger and the socket members.

It is to be noted that the longitudinal axis of the socket and plunger members and the coil spring form an acute angle with the vertical plane of movement of either the forward or the rear axle; and the parts and their proportions are such that said angle is never permitted to become a right angle, for obvious reasons.

The tension apparatus may be applied for use with the forward axle; I prefer, however, to apply it to the spring suspension of the rear axle, as shown. In fact it may not be used at all; but where varying loads may be carried, it is most desirable. This apparatus may be said to comprise the following structure: A power lever 20 is fixed to and depends from the spring supporting shaft 9. Its free end portion is slotted, and there pivoted, is a block 21 having extending through, and in screw engagement with it, a tension rod 22, one end portion, unthreaded, having a head 23, the under side of which engages and abuts the spherical surface of a stop block 24 fixed to the chassis and having a conical chamber 25 to permit angular motion of the tension rod 22. The outside free end portion of the tension rod has a pivoted crank 26 which may be caused to assume either an operative or an inoperative position, as shown in Figs. 3 and 4.

By turning the crank 26 in one direction, and hence the power or tension lever 20, the spring supporting shaft 9 and the supporting lever 8, the piston or plunger member 2 is caused to move toward or into the socket member, thereby increasing the compression of the coil spring 5; while should the crank be rotated in the reverse direction the opposite phenomena would follow. But to measure arbitrarily the tension to be given to the spring, there are provided a dial 27 and a pointer 28 operatively connected to the tension lever 20; the dial 27 being marked with various lines corresponding to the various positions assumed by the pointer, under various loads, in order that the springs for the rear axle may be given the various tensions that will enable the vehicle to ride with the greatest ease.

The operation of my invention is almost obvious. The rear axle C, for example, being held transversely of the vehicle but capable of movement toward or away from the body of the vehicle, by reason of the connecting levers; the spring 5 resists the compression due to the weight of the chassis acting downward through the shaft 9, lever 8, plunger 2, and shoulder 7 against the upper end of the spring 5, the piston 3 of the plunger 2 moving downward in the phosphor-bronze lining 4 in the socket member 1; the opposite end of the spring abutting the shoulder 6 on the socket member. It is to be noted that the upper end of the plunger although pivoted to the lever, is in substance pivoted to the chassis, for the lever is held in any one position assumed, by the rotatable adjusting rod 22, in screw engagement with the adjusting tension lever 20, and locked against longitudinal movement by the head 23 and the abutment block 24 of the chassis. As a consequence of this construction, the ends of the coiled spring are caused to move in parallel, or substantially parallel vertical planes, at varying speeds toward or away from each other, while the spring itself becomes compressed, or expands, and simultaneously forms with said vertical, parallel planes, a greater or less acute angle, because the spring is varyingly inclined rather than vertical, in relation to the axle; and there is for a given amount of compression of the spring, an increase in the force applied, a greater relative movement between the axle and the chassis, or body of the vehicle, and hence a greater period of time for each oscillation of the body in relation to the ground, than there would be, did the spring occupy a vertical position. It is also not to be forgotten that because the spring is inclined rather than vertical, there is, for a given amount of compression of the spring, greater relative movement between the axle and the chassis or body of the vehicle, and hence a greater period of time for each oscillation of the body in relation to the ground, than there would be, did the spring occupy a vertical position. Assuming the spring is adjusted for a load equal to the weight of two people, and that it is proposed to carry six persons, then the adjusting crank 26 is swung into operative position and so turned as to move the lever 20 inward, causing the pivoted pointer 28 to move along the dial 27, and the plunger 2 to compress the spring 5 until the pointer reaches a line indicating the amount of compression required for easy riding of the vehicle carrying six persons. The handle is then swung into inoperative position, as in Fig. 3, and the vehicle is ready for use.

I will now describe a different form of device for giving to the rear spring the desired tension, said device being located in front of the operator, rather than at the rear of the car.

In a supporting column 30, Fig. 6, secured in a bracket 31, fast to the foot of the engine frame 32 and braced from the cross brace channel 33, by the brace 34, is an adjusting screw 35 passing down within the column into an adjusting nut 36. This adjusting screw is supported at the upper end by a thrust ball bearing 37 which is free to revolve and oscillate on an indicator bracket 38. A crank 39 is screwed, and securely pinned by a pin 40 to the adjusting screw. The inside diameter of the supporting column is large enough to allow the adjusting nut 36 to oscillate at will. A yoke rod 41 is attached to the short arm of a bell crank lever 42 by yoke ends, and is in turn attached to the adjusting lever 20 which, as already described, is secured by a key and pin to the rear spring supporting shaft 9. The adjusting nut 36 carries an eye bolt 43, to which is attached an indicator cord 44; this cord passes over a guide pulley 45, which is attached to the indicator bracket 38—to an indicator 47. A spring 48 is attached to the indicator, and acts in opposition to the pull of the indicator cord. The core 49 of the adjusting screw and adjusting nut may be partially filled with oil by a removal of the cap nut 50. Such construction permits a lubrication of the screw without putting the oil under compression. By applying power to the handle 39, the adjusting nut 36 is moved up or down, and, through the bell crank lever 42, the yoke rod 41, adjusting lever 20, and rear supporting spring shaft 9, the desired tension is given to the spring 5, as already explained. As the tension in the rear spring is increased or diminished, the indicator spring 48 at the rear of the dashboard, expands or contracts, keeping the indicator cord 44 tight, and moving the indicator along the graduated slot in the indicator bracket 38. This shows to the operator the approximate tension on the rear car springs. This modification is the more convenient form, but necessarily more expensive than that above shown and described.

The auxiliary arm Y shown in Fig. 1 is divided centrally to permit the free movement of the steering bar 21 for the forward wheels. This, however, constitutes no feature of my invention.

Should a spring break, its length would simply be reduced an amount equal to, say, the distance between two adjacent coils, but still the vehicle body would be riding on two coil springs remaining in line, very likely riding almost as easily as before; if not, the desired tension could be given to the broken spring by operating the spring tension creating devices just described. Further description of the operation is unnecessary.

Desiring to protect all the features of my invention in the broadest manner legally possible, what I claim is:

1. In a vehicle having a compensating spring such as described: a depending arm pivoted to the vehicle, and through suitable means, pivotally connected to one end of said coil spring; an abutment fixed in relation to the vehicle body; a threaded tension rod whose longitudinal movement in one direction is limited by said abutment and whose rotary movement causes the arm and hence the coil spring to become more or less compressed.

2. In a vehicle having a compensating spring such as described:—a depending arm pivoted to the vehicle, and, through suitable means, pivotally connected with one end of said coil spring; a stop block fixed to the vehicle body and having a spherical abutting surface; a threaded tension rod pivotally connected with said arm and passing through said stop block, a head fixed to the end of said tension rod and abutting said spherical surface on said block; whereby the desired minimum amount of tension may be given to said spring and maintained.

3. In a vehicle having an axle movable toward and away from the body of the vehicle, and held transversely of the body:—a compensating spring comprising a socket member, a plunger member longitudinally and movably mounted in the socket member;

and a compressible coil spring supported by said members; and pivotal means for connecting said socket member and the plunger member respectively to the axle and the vehicle; said socket member serving as an oil receptacle, and said plunger member having a longitudinal channel connecting said receptacle, and an opening which is on the surface of said plunger, but which always lies within the socket member; all designed to insure perfect lubrication between the plunger and socket members.

In testimony whereof I hereunto affix my signature in the presence of two witnesses.

WILLIAM E. EASTMAN.

Witnesses:
A. I. CRAWFORD,
B. M. SHEDD.